United States Patent [19]

Leunig et al.

[11] 4,041,777

[45] Aug. 16, 1977

[54] METHOD AND APPARATUS FOR TESTING CARBURETORS

[75] Inventors: Ernst Leunig, Fallersleben; Hans A. Schultze, Giessen; Christian Pfeifer, Grunberg, all of Germany

[73] Assignee: Karl Weiss - Giessen, Fabrik Elektrophysikalischer Geraete, Werk Lindenstruth, Lindenstruth, Germany

[21] Appl. No.: 448,928

[22] Filed: Mar. 7, 1974

[30] Foreign Application Priority Data

Mar. 8, 1973 Germany .......................... 2311486

[51] Int. Cl.[2] .............................................. G01F 9/00

[52] U.S. Cl. ...................................................... 73/118

[58] Field of Search ........................ 73/118, 119 R, 3

[56] References Cited

U.S. PATENT DOCUMENTS

| | | | |
|---|---|---|---|
| 2,597,231 | 5/1952 | Edelen | 73/118 |
| 2,755,663 | 7/1956 | Smith et al. | 73/3 X |
| 3,448,609 | 6/1969 | Sibeud | 73/113 |
| 3,469,442 | 9/1969 | Brueckner | 73/118 |
| 3,604,254 | 9/1971 | Sabuda | 73/118 |
| 3,851,523 | 12/1974 | Converse et al. | 73/118 |

*Primary Examiner*—Jerry W. Myracle
*Attorney, Agent, or Firm*—Michael J. Striker

[57] ABSTRACT

A method of testing a device, especially a carburetter of an internal combustion engine, in which a predetermined constant fluid flow is imposed through the device, the fluid pressure at the inlet of the device is measured and the measured fluid pressure at the inlet is compared with a desired value of fluid pressure at the predetermined flow-through, whereafter an adjusting means is adjusted until the measured value is substantially equal to the predetermined value; and an apparatus for carrying out the method.

20 Claims, 3 Drawing Figures

METHOD AND APPARATUS FOR TESTING CARBURETORS

Figure 1:
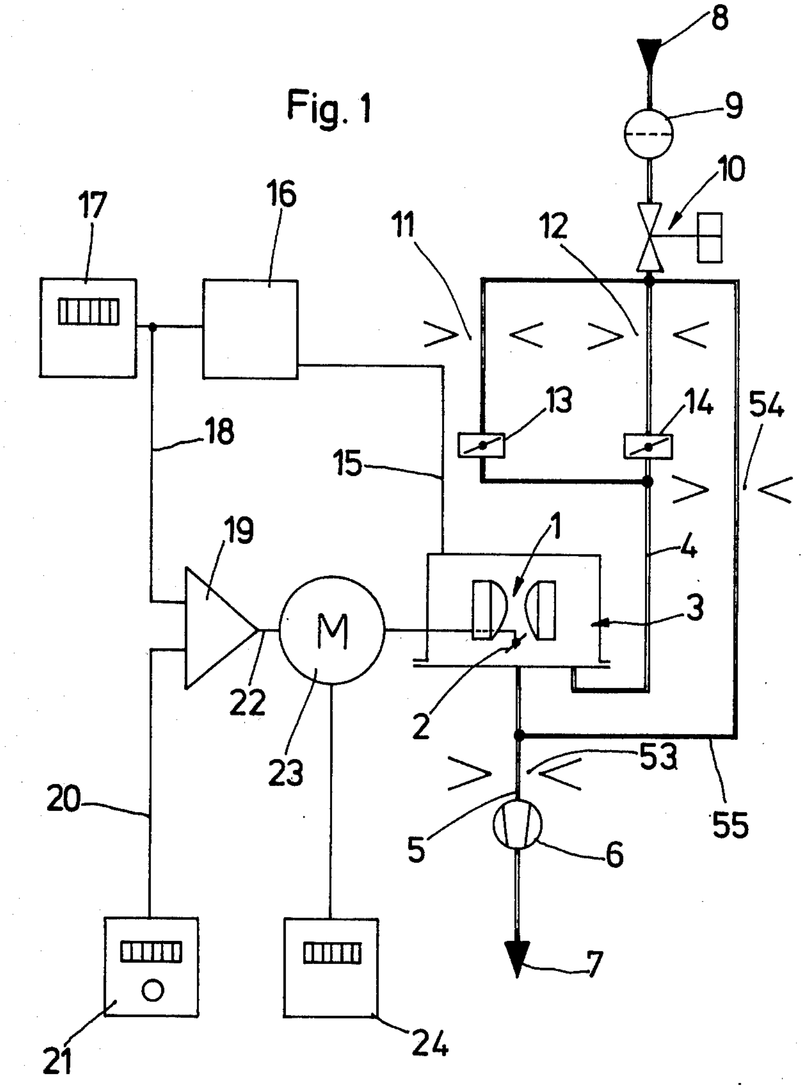

This invention relates to a flowback, i.e. an apparatus for testing a flow conducting device, through which a fluid is passed by the apparatus; the invention also relates to a method of testing a flow conducting device by means of a flow bank.

The invention is especially intended for application to the testing of a carburetter in a flow bank for carburetters, although it may also be employed for other purposes, for example for testing air flow meters for an electronic fuel injection system. For presenting a good picture of the measuring problem which is involved here, consideration will be given to the preferred example of application of the invention, that is to say to the testing, in a flow bank for carburetters, of a carburetter which is equipped with an adjustment means in the form of a butterfly valve. Testing proceeds according to whether the adjustment means has a position such that, when a specific pressure is present at the inlet side of carburetter (fore-pressure), a specific and prescribed value of flow through the carburetter will be assured. As a number of mutually independent variables—that is to say forepressure, throughput, and pressure downstream of the device to be tested—are involved here, a number of values have to be determined by suitable measurement techniques and devices. Not only does this entail appreciable expense, in terms of the means required for carrying out the measurements, but inaccuracies are also liable to occur.

Accordingly, what is desired is a method of the above defined general type and a flow blank for carrying out this method, in which the technological means for carrying out the method and for constructing the flow blank are reduced to a minimum.

The method proposed according to the invention is characterised in that a predetermined and constant throughput of the fluid is imposed on the device to be tested by elements of the flowbank, the actually existing value of pressure (forepressure) effective at the inlet side of the device to be tested is ascertained, and is compared with a prescribed set value of the forepressure which is appropriate for this flow-through.

An important feature of the invention resides in the fact that a pre-determined, constant throughput of the fluid through the device to be tested is maintained throughout the whole testing or measurement procedure; and it is determined —by measuring a value, that is to say the forepressure—whether this actually existing value of the forepressure corresponds to that prescribed set value of the forepressure which, in operation, is ncessary to achieve the predetermined value of the flowthrough.

Very boradly speaking, the invention is thus concerned with a testing method. However, this does not restrict the invention in any way to a method which merely provides a "good" or "bad" pronouncement. Indeed, the method may be of a nature such that—in the case of a device to be tested which incorporates an adjustment means, for example a carburetter which incorporates a butterfly valve—the adjustment means is adjusted in the manner of a control procedure. To this end, in a modification of the method, the adjustment means of the device to be tested is, in the case of the predetermined constant throughput, actuated until the actually existing value of forepressure is at least approximately equal to the set value. As had already been pointed out, this actuation of the adjustment means does not necessarily have to be carried out manually but may also be carried out—and this is of particular importance for batch-testing or batch-adjustment carried out during the manufacturing process—by an automatic control apparatus.

The flow bank, which is constructed for carrying out the method is distinguished by the fact that the elements in the flow path lying upstream of the device to be tested include at least one nozzle (nozzle in which critical flowthrough conditions are maintained) which is so arranged that the throughput of the fluid through it is a function of the pressure and temperature of the medium at the inlet side of this nozzle, and also of a nozzle constant, although this throughput is not a function of the forepressure; and means are associated wth this nozzle (in which critical flowthrough conditions are maintained) which serve to maintain constant the pressure and temperature of the fluid at the inlet side of the nozzle.

As is known, the expression "a nozzle in which critical flowthrough conditions are maintained" means a nozzle in whose portion of narrowest cross-section the fluid flows at the speed of sound. The throughput of the fluid through a nozzle of this type is a function of the pressure and of the temperature in front of the nozzle, and also of a nozzle constant. Accordingly, means are provided for maintaining constant the pressure and temperature of the fluid at the inlet side of the nozzle in which critical flowthrough conditions are maintained.

On the outlet side the flow bank may operate against normal atmospheric pressure, and it has been found that the constancy of this pressure is adequate. However, flow banks are frequently operated subjected to underpressures. Means will then be required for maintaining constant the pressure of the fluid at the outlet side of the device to be tested. These means may for example consists of a controlled vacuum pump, although it is also possible to provide a further nozzle in which critical flow conditions are maintained and which lies downstream of the device to be tested.

If consideration is again given to the case of an adjustable device to be tested, that is to say for example a carburetter equipped with a butterfly valve, then an appropriate embodiment of the proposed flow bank may be characterised in that, for the purpose of obtaining a signal which is representative of the actually existing value of the forepressure, there is provided a pressure gauge whose output signal is fed to a control means including a motor which serves to position or adjust the adjustment means, this control means being, further, connected to a means for generating a signal which is representative of the set value of the forepressure. Thus, the adjustment means, which is intended to respond as a control device and which is for example constituted by a butterfly valve, is automatically adjusted to that value of the forepressure which should be achieved for the flowthrough set by the nozzle in which critical flowthrough conditions are maintained.

It may be found advantageous, for the purpose of adjusting for different quantities of the fluid which are fed to the device be tested, to provide a number of nozzles in parallel, critical flowthrough conditions being maintained in each of these nozzles and each of the nozzles being equipped with a flow control valve, these nozzles being inserted selectively or in specific combinations in the flow path. For achieving similar results a plurality of devices may be tested simultaneously with the same flow bank. An embodiment of flow bank by means of which this may be achieved includes a plurality of flow paths, intended to accommodate a plurality of devices to be tested, arranged in parallel and downstream of the nozzle.

As has aleady been explained, it is necessary to control the temperature on the inlet side of the nozzle in which critical flowthrough conditions are maintained, or on the inlet side of each of such nozzles, when a number of them are present, so that when a constant under pressure is maintained downstream of the device to be tested—the throughput passing through the nozzle, and also the forepressure, will be constant. With this in view a temperature controlled heat exchanger may be arranged upstream of the nozzle and serve to maintain a predetermined and prescribed value of temperature of the fluid on the inlet side of the nozzle. It has also to be borne in mind that—in addition to the temperature of the fluid upstream of the nozzle—the temperature at other points along the flow bank is also important for the accuracy with which the prescribed value of throughput of the fluid flowing through the device to be tested is maintained. The use of nozzles in which critical flowthrough conditions are maintained in liable to lead to undesired temperature alterations in consequence of compression of the flowing medium upstream of the nozzle, and also in consequence of expansion of the medium in and downstream of the nozzle. It must also be realised that parts of the flow bank may undergo thermal exchange with objects or parts which are at a different temperature and also with the ambient atmosphere; consequently, means for maintaining constant the temperature of the fluid at the inlet side of the nozzle may, generally speaking, be insufficient. Indeed suitable means may also be provided at other points (at least at other critical points) along the flow bank. Naturally, this may be accomplished by the provision of further heat exchangers or the like.

However, to this end, the preferred embodiment of the invention makes advantageous use of means which are, as has been stated above, provided for maintaining constant the pressure on the inlet side of the nozzle, in which critical flowthrough conditions are maintained. This preferred embodiment of the invention has a duct system, which is equipped with a flow control means and branches off from the flow path at a point between the nozzle and the heat exchanger for maintaining a predetermined and prescribed value of pressure of the fluid at the inlet side of the nozzle, this duct system at least reducing thermal exchange between parts of the flow bank and its surroundings.

By means of this special form of construction of the means for maintaining constant the pressure at the inlet side of the nozzle the superfluous part of the fluid—which, however, has already passed the above-mentioned heat exchanger and accordingly conforms to the prescribed value of temperature—is thus led to other parts of the flow bank where it can at least reduce thermal exchange (such as would adversely affect the operation of the flow bank) between parts of the flow bank and its surroundings. For example, this may be accomplished by arranging for the duct system to form a chamber through which the nozzle passes and through which the fluid flows. Thus, the nozzle wall is protected from its surroundings by a preferably annular chamber through which the fluid flows.

Another point along the flow bank which is sensitive to temperature influences lies in the vicinity of the device which is to be tested, that is to say a chamber provided for accommodating a carburetter. It will, therefore, be found satisfactory if the duct system defines a chamber through which the flow path passes in the vicinity of the device to be tested, and through which the fluid flows. The chamber provided for accommodating the apparatus to be tested may be provided with a cover and also with infeed and discharge ducts for controlling flow of the fluid. Under these circumstances this chamber, and also the chamber which has just been referred to and through which the fluid flows, will be so arranged that the chamber for accommodating the device to be tested lies contiguously of, and in heat conducting relationship with, the chamber of the duct system by means of at least two walls. On the other hand a third wall of the chamber, provided for accommodating the device to be tested, is exchangeably mounted on its chamber and is equipped with connections for the particular device to be tested; thus, the flow bank may be used for differently constructed and arranged devices to be tested simply by exchanging this third wall. It will be understood that this third wall is not one of the walls which is in contact with the flowing medium. Thus, this chamber for accommodating the device to be tested is, insofar as possible "immersed" in that part of the fluid which, as it has passed through the above-mentioned heat exchanger, has been given a predetermined temperature and which has been by-passed (branched off) at a point lying upstream of the nozzle.

'A further heat exchanger may be provided at a point in the flow path lying between the nozzle and the device to be tested, and may serve to maintain a predetermined and prescribed value of the temperature of the medium at the inlet side of the device to be tested. The duct system is arranged to pass alongside the fluid flow path at this particular point. The use of a further heat exchanger affords the advantage that is thereby possible to feed the two heat exchangers with heating or cooling agents which have different temperatures, and to therefore take appropriate action to meet the circumstance of temperature alterations which take place, in the flowing medium, in the nozzle in which critical flowthrough conditions are maintained. For the purposes of the invention, therefore, the term "heat exchanger" is to be understood to mean not only an apparatus for heating the fluid but also an apparatus for cooling the fluid. If the heat exchanger and/or the further heat exchanger has a temperature which only differs slightly, for example by 1° C, from the prescribed value of temperature of the fluid, this heat exchanger will not only exercise a temperature-regulating but also a temperature-controlling function, and may automatically compensate for rapid error values which occur in the flow bank. From the technical or constructional point of view this means that the heat exchanger concerned should be made as large as possible.

Attention will now be devoted to a special example of application of flow bank for carburetters, in which fuel is fed to the 'carburetter' to be tested. Under these conditions the fuel feed system will be equipped with a heat exchanger for maintaining a pre-determined and prescribed value of temperature of the fuel. This heat exchanger may for example lie in a widened portion, resembling a vessel or container, of the fuel feed duct. This affords the advantage that is not then necessary to keep a large quantity of fuel at a specific temperature, but merely to bring the relatively small amount of fuel, required at any given time, to the prescribed temperature value. At least a part of the fuel heat exchanger can be arranged to form a chamber through which the fuel feed duct passes. By the term "heat exchanger" is meant that part of a heating of cooling device which possesses the heat exchange surfaces, including the infeed and discharge ducts for a heating agent or coolant. Thus, when the thermal exchange surfaces of the heat exchanger are, in the above-described manner, located in a portion of the fuel feed duct which is widened so as to define the shape of a vessel, the feature that whereby a chamber through which the fuel feed duct passes is formed by a part of the heat exchanger, means that branched ducts extend from the infeed and discharge duct to a tube which surrounds the fuel feed duct.

The fuel heat exchanger should also be large and may have a temperature which only differs slightly from the prescribed value of temperature of the fuel; in this way error values can be automatically compensated for. As has already been made clear from this description of the invention, the invention enables, in a favourable manner, the flow bank to be freely constructed and set out according to requirements. For example, components may be used which are protected from explosions and, instead of providing one chamber for one device to be tested, it is also possible to connect a number of chambers to the same nozzle or to the same nozzles for the purpose of enabling a number of devices to be simultaneously tested. A further advantage resides in the fact that it is possible to structurally combine the parts which directly determine the conditions of the flow and also the means serving to maintain these flow conditions constant. The flow bank can assure rapid operation even when the throughput through the device to be tested is altered. This makes the flow bank also suitable for batch testing, for example for batch testing carburetters in the course of their manufacture.

Figure 2:
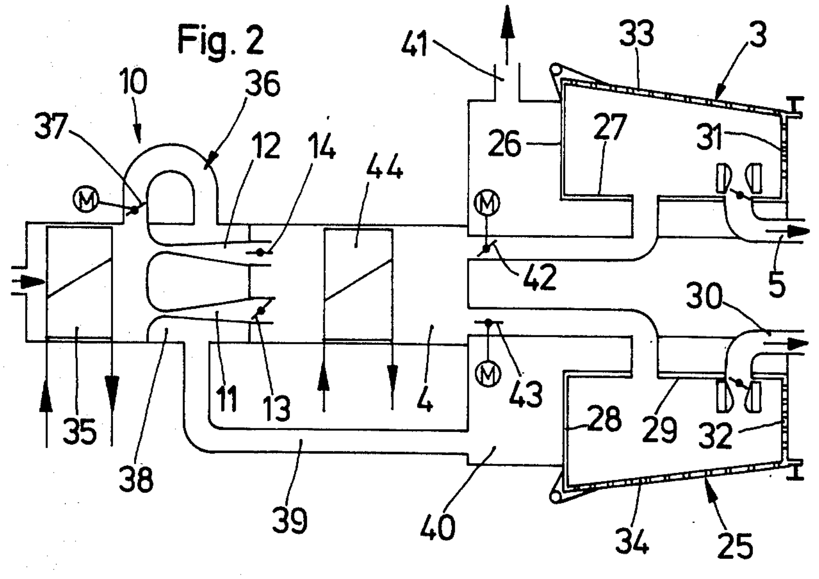
Figure 3:
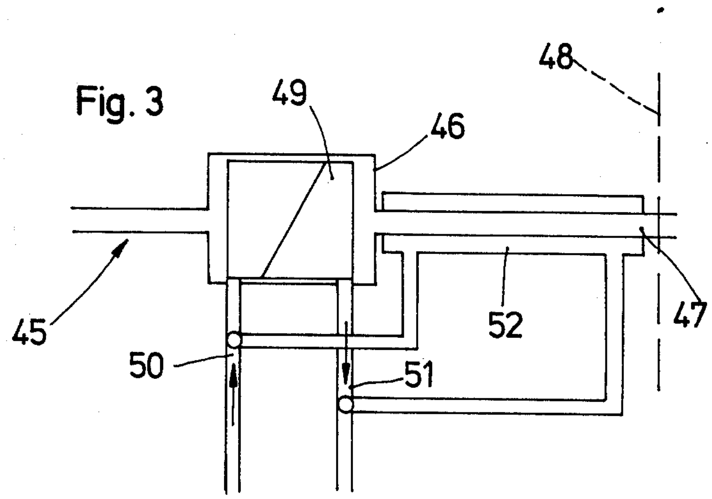

The invention will be described further, by way of example only, with reference to the accompanying drawings, in which:

FIG. 1 diagrammatically illustrates the construction of a flow bank for testing carburetters; and FIGS. 2 and 3 are diagrammatic sectional views preferred embodiments of means for maintaining temperatures and pressures constant.

In FIG. 1, a carburetter 1 is accommodated in chamber 3, and comprises a butterfly valve 2, which is of known construction and serves as an adjustment means. Air is fed to the chamber 3 by way of a duct 4 and is sucked out of chamber 3 by way of a further duct 5, which is equipped with a vacuum pump 6 and an outlet 7. A control system 10 lies downstream of the air inlet 8 and a filter 9, and serves to adjust the pressure upstream of two nozzles 11 and 12 in which the air is subjected to critical throughflow conditions. Thee two nozzles 11, 12 are in parallel with one another; associated with the two nozzles 11, 12 are two respective flow control valve 13, 14, so that by switching in one or other of the differently-dimensioned nozzles 11, 12 one of a plurality of adjustable air throughputs can be fed to the chamber 3 through the duct 4.

A signal which represents the actually existing value of the forepressure (i.e. the pressure prevailing at the inlet side of the carburetter 1) is obtained by way of a measuring device 16 connected by line 15 with the interior of the chamber 3 and an absolute pressure gauge 17. This signal is transmitted by a line 18 to a differential amplifier 19 which also receives a signal representing the set value of forepressure from a set value signal generator 21 through a line 20. Difference signals, representing the difference between the set value and the existing value, are fed from the output of the differential amplifier 19 to a positioning motor 23, by means of which the position of the butterfly valve 2 is controlled. Thus the butterfly valve 2 is brought to the position in which the set value of the forepressure (for the give throughput) is achieved. However, alteration of the adjustment of the throughput only takes place through changeover of the instantaneously operative nozzles 11, 12. The motor 23, serving to position the butterfly valve 2, is at the same time coupled to an indicator 24, by means of which the butterfly valve position can be ascertained.

As has already been stated, the flow bank only functions with the required accuracy if temperature and pressure (in particular) are controlled, at the input side of the nozzles 11, 12, to specifically prescribed values. Suitable means are shown in FIG. 2, in which the same reference numerals are used as in FIG. 1 for similar parts.

Firstly, the arrangement illustrated in FIG. 2 differs from that shown in FIG. 1 by the provision of a second chamber 25 accommodating a second carburetter. The two chamber 3 and 25, each of which accommodates a carburetter, are in parallel with one another in the flow path lying downstream of the nozzles 11, 12. Each of these chambers 3,25 has four fixed walls, those designated 26,27 and 28,29 being clearly apparent in the drawing. The duct 4 opens out into the walls 27 and 29, and discharge ducts 5,30 respectively lead out of the same walls. The carburetters which are to be tested are positioned at the respective entrances of these discharge ducts 5,30. A further wall, which may be described as an end wall, is designated as 31,32. This end wall 31,32 is exchangeable, and is provided with connections and holding means (not shown) for the carburetters; accordingly, the flow bank can be adapted to different types of carburetter simply by exchanging this end wall. Finally, the chambers 3 and 25 are respectively closed off by covers 33 and 34.

A heat exchanger 35 is located in the flow path upstream of nozzles 11, 12, and serves to bring the stream of air to a predetermined temperature before it passes into the nozzle 11 or 12 which has been switched into operation. The procedure may, for example, be as follows: air at a relatively low temperature, for example 5° C, and at a specific relative humidity, coming from the air inlet 8 (FIG. 1) is heated by the heat exchanger 35, which is operated as a heater and has a large heat exchange surface. In this way one prerequisite is satisfied for obtaining a specific and constant throughput through the particular one of nozzles 11, 12, which has been switched into operation at any given time.

The other pre-requisite consist in maintaining a specifically prescribed value of pressure at the inlet side of the selected nozzle. This second pre-requisite can be satisfied, in the embodiment illustrated in FIG. 2, by the control system 10, which comprises a by-pass duct system 36 containing flowthrough control member 37, which is this embodiment is a butterfly valve. Accordingly, a part of the air (which has already been brought to the specifically prescribed temperature by the controlled heat exchanger 35) is by-passed to an extent determined by the setting of the flowthrough control member 37.

The duct system 36 includes an annular chamber 38, through which the nozzles 11 and 12 extend, so that this chamber 38 protects the wall surface of these nozzles 11, 12 from alterations in temperature. It will thus be seen that the by-passed portion of air will flow through this annular chamber 38, this air having the predetermined temperature. The air flows, by way of a duct 39, from the annular chamber 38 to a further annular chamber 40 which protects from external temperature influences the flow path located in the vicinity of the chambers 3 and 25, before leaving through a discharge duct 41. As is clear from FIG. 2, the walls 26 and 27, and also the walls 28 and 29, of the chambers 3 and 25 (which, as stated above, each accommodates a carburetter to be tested) simultaneously constitute walls of the annular chamber 40, so that favourable conditions of heat exchange are ensured between the annular chamber 40 and the chambers 3,25.

Located between the nozzles 11, 12 and two valves 42, 43 (which can individually cut off the chambers 3 and 25) is the further heat exchanger 44, which serves to maintain a prescribed temperature for the air upstream of the carburetter (or carburetters) to be tested. The heat exchanger 44 is usually necessary, and will usually be independent of the first heat exchanger 35, because an alteration in the temperature of the air can take place (compared with the temperature existing directly upstream of the nozzles) owing to compression and expansion of the air passing through the nozzles 11 and 12.

In the special case of a flow bank for carburetters, the fuel (e.g. petrol) which is fed to the carburetter to be tested should be brought to a specific temperature. FIG. 3 illustrates a preferred embodiment of apparatus serving this purpose. A fuel supply duct 45 is widened to form a chamber 46, from which a further fuel duct 47 extends. This further duct 47 opening out at 48 into an associated connection of the carburetter to be tested. The chamber 46 contains a heat exchanger 49 equipped with an infeed duct 50 and a discharge duct 51 for a heat carrier. The heat exchanger 49 constitutes, in this embodiment, one of two component parts of a heat exchange assembly, the other of these two components 52 being in the form of a jacket which surrounds the duct 47. In this way it is ensured that the fuel, flowing through the duct 47, will at least approximately maintain the temperature which has been arrived at by means of the heat exchanger 49.

The nozzles 11, 12, in which critical flow conditions prevail, will normally be constituted as Laval nozzles, with pressure recovery by a downstream-arranged diffuser. If a nozzle shape according to STODOLA and SMITH is employed (this nozzle shape being explained theoretically by E. SCHMIDT in *Thermodynamik*, 1960, pp. 271 ff.) then the speed of sound can be attained in the nozzle when the difference pressure is only about one quarter of the pressure obtaining upstream of the nozzle. However, it should be pointed out that, for the purposes of the present invention, the "nozzle" in which critical flow conditions prevail" can include any duct assembly or diaphragm assembly having the specified characteristics.

The flow bank may also be used for the testing of air flow meters for electronic fuel injection.

The control system 10 may be constructed as a nozzle in which critical flow conditions are maintained. This affords the advantage that the adjustment time for stable conditions can be dispensed with when desired alterations of the flowthrough of the fluid are carried out. Thus, the flow through the nozzles (in which critical conditions of flowthrough are observed) must, for this purpose, be interrupted in front of the device to be tested, that is to say the medium is led off (by-passed) by way of the duct system 36.

It has hitherto been assumed that the pressure at the outlet side of the carburetter 1 is held constant by a suitable arrangement of the pump 6. A control assembly, with its adjustment time, for the vacuum pump 6 can be dispensed with if at least one further nozzle 53 (FIG. 1) in which critical conditions of flowthrough are observed, is provided downstream of the carburetter 1.

When the device to be tested is a carburetter, it has to be taken into account that there is fed into the test fluid (air) one constituent (fuel in this example) which impairs the attempt to maintain the pressure constant by the nozzle 53 in which critical conditions of flowthrough are maintained. It is possible to combat this drawback by providing a by-pass 55, which is equipped with at least one nozzle 54 in which critical conditions of flowthrough are maintained, the by-pass 55 being branched off at a point between the system 10 (whereby the pressure upstream of nozzles 11, 12 is maintained constant) and the nozzles 11, 12; this by-pass 55 opens out again into the outlet duct 5 upstream of the nozzle 53 in which critical conditions of flowthrough are observed. If the system 10 includes a nozzle in which critical flowthrough conditions are observed, this nozzle can at the same time constitute the nozzle 54. The by-pass then leads into the discharge ducts 5 and 30 (FIG. 2), so that it is in a large measure possible to use, for "thinning" the mixture downstream of the carburetter, duct systems which are in any case present for maintaining the temperature constant. The heat exchanger for maintaining constant the temperature upstream of the further nozzle may also lie upstream of the further nozzle in which critical flowthrough conditions are maintained.

The heat exchangers may contain heating and cooling devices as well as means for de-humidifying the fluid.

What we claim is:

1. Apparatus for testing a device through which a fluid passes, comprising means for passing a fluid through the device and including at least one nozzle upstream of the device; means for maintaining the pressure and temperature constant at the inlet side of said nozzle so as to maintain the throughput of the fluid constant; means for indicating a first signal corresponding to the pressure value at the inlet end of the device; signal generating means for generating a second signal representing a desired value of pressure at the inlet end of the device; and comparator means connected to said signal indicating means and said signal generating means for comparing said first and said second signal.

2. Apparatus as claimed in claim 1, and including adjustment means on the device to be tested, a motor connected to said adjustment means for adjusting the position of the latter, said motor being connected to said comparator means to be actuated for adjusting said adjustment means when said first signal deviates from said second signal.

3. Apparatus as claimed in claim 1, further comprising means for maintaining constant the pressure of the fluid at the outlet side of the device to be tested.

4. Apparatus as claimed in claim 3 in which the means for maintaining constant the pressure at the outlet side of the device to be tested comprises at least one further nozzle in which critical flowthrough conditions are maintained, this nozzle being in the fluid flow path downstream of the device to be tested.

5. Apparatus as claimed in claim 4, for testing device in which a constituent is added to the fluid, the apparatus including a by-pass line having at least one nozzle in which critical flowthrough conditions are maintained, the by-pass line branching off from the fluid flow path at a point lying between the first-mentioned nozzle and the means for maintaining constant the pressure in front of the nozzle, the by-pass line returning to the flow path at a point upstream of the said further nozzle in which critical flowthrough conditions are maintained.

6. Apparatus as claimed in claim 1, including a temperature-controlling heat exchanger in the flow path upstream of the nozzle, to maintain a predetermined temperature of the fluid at the inlet side of the nozzle.

7. Apparatus as claimed in claim 6, including a duct system, which has a flow control member and is branched off from the flow path at a point between the heat exchanger and the nozzle, in order to maintain a predetermined pressure of the fluid at the inlet side of the nozzle, the duct system being arranged to at least reduce thermal exchange between parts of the apparatus and its surroundings.

8. Apparatus as claimed in claim 7, in which the flow control member is constituted by a nozzle in which critical flowthrough conditions are maintained.

9. Apparatus as claimed in claim 7, in which the duct system defines a chamber through which the nozzle extends and through which the fluid flows.

10. Apparatus as claimed in claim 7, in which the duct system defines a chamber through which the fluid flow path passes in the vicinity of the device to be tested, and through which the fluid flows.

11. Apparatus as claimed in claim 10, including a chamber for accommodating the device to be tested, the chamber which having a cover and inflow and outflow ducts for the fluid, at least two walls of the chamber being contiguous with and in heat-conducting relationship with the chamber defined by the duct system.

12. Apparatus as claimed in claim 11, in which a third wall of the chamber for accommodating the device to be tested, is exchangeably arranged on this chamber and is equipped with connections for the particular device to be tested at any given time.

13. Apparatus as claimed in claim 12, including a second heat exchanger in the fluid flow path between the nozzle and the device to be tested, to maintain a predetermined temperature of the fluid at the inlet side of the device to be tested.

14. Apparatus as claimed in claim 13, in which the duct system runs alongside the flow path in the vicinity of the second heat exchanger.

15. Apparatus as claimed in claim 1, for testing a carburetter, the apparatus including a fuel feed line for the carburetter, the fuel feed line being provided with a heat exchanger for maintaining a predetermined temperature of the fuel.

16. Apparatus as claimed in claim 15, in which the fuel heat exchanger lies in a widened portion of a fuel supply duct.

17. Apparatus as claimed in claim 15, in which at least a part of the fuel heat exchanger constitutes a jacket through which the fuel feed line passes.

18. Apparatus as claimed in claim 1, in which the or each nozzle in which critical flowthrough conditions in maintained is a Laval nozzle with pressure recovery.

19. A method of testing a device through which a fluid flows and having adjusting means, comprising the steps of imposing a predetermined constant fluid flow through the device; measuring the fluid pressure prevailing at the inlet end of the device; comparing the measured value of fluid pressure with a predetermined value which is prescribed for the predetermined flowthrough of the fluid; and adjusting the adjusting means until said measured value is at least substantially equal to said predetermined value, while maintaining said predetermined constant throughflow.

20. A method as claimed in claim 19, and comprising the steps of providing a first signal corresponding to said measured value and a second signal corresponding to said predetermined value, and automatically operating said adjusting means for adjusting the latter when said first signal deviates from said second signal.

* * * * *